W. F. BERNSTEIN.
VEHICLE FOR HOSPITAL AND OTHER PURPOSES.
APPLICATION FILED DEC. 10, 1908.
922,841.
Patented May 25, 1909.
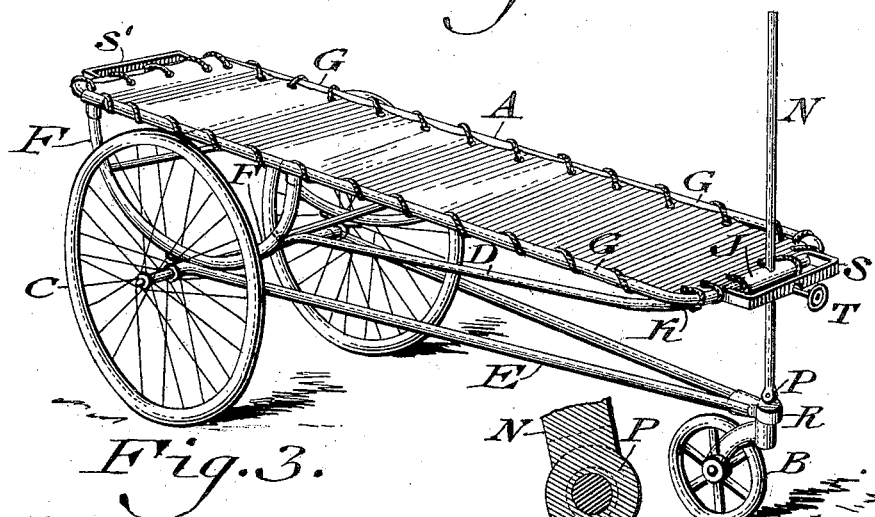
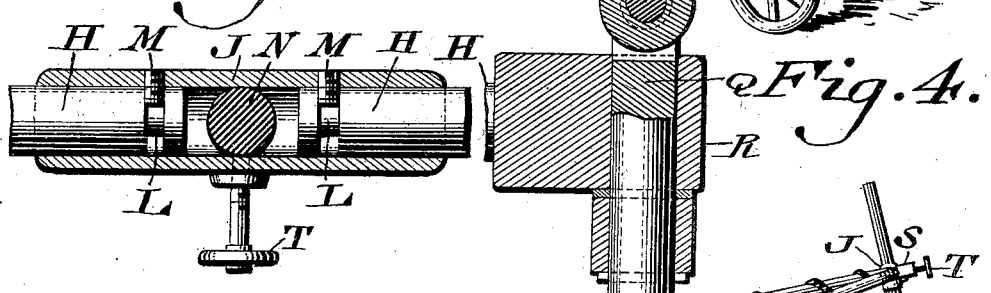
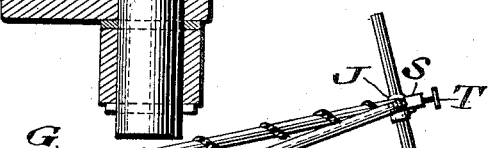
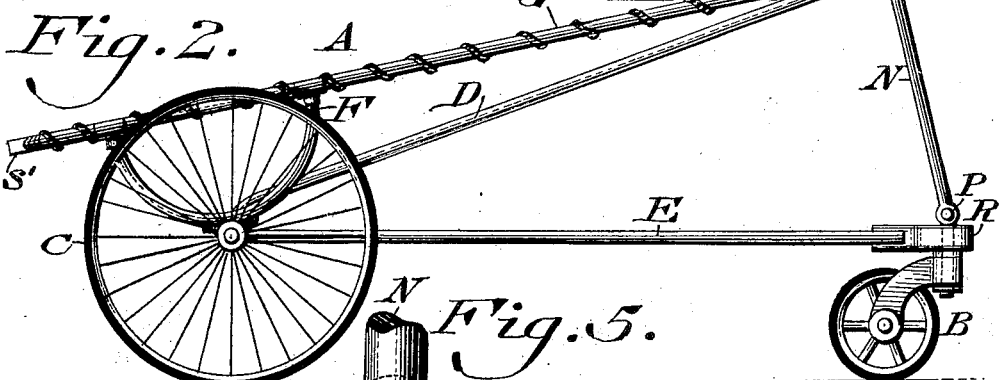

UNITED STATES PATENT OFFICE.

WILLIAM F. BERNSTEIN, OF PHILADELPHIA, PENNSYLVANIA.

VEHICLE FOR HOSPITAL AND OTHER PURPOSES.

No. 922,841.

Specification of Letters Patent.

Patented May 25, 1909.

Application filed December 10, 1908. Serial No. 466,800.

*To all whom it may concern:*

Be it known that I, WILLIAM F. BERNSTEIN, a citizen of the United States, residing in the city and county of Philadelphia, State of Pennsylvania, have invented a new and useful Vehicle for Hospital and other Purposes, of which the following is a specification.

My invention consists of a vehicle for hospital and other purposes, embodying a bed, and mountings therefor, with means for placing the bed in inclined or horizontal position without liability of certain members employed to bend one on the other, and there is a simplification of construction and strength of parts, as will be hereinafter described.

For the purpose of explaining the invention, the accompanying drawing illustrates a satisfactory reduction of the same to practice, but the important instrumentalities thereof may be varied, and so it is to be understood that the invention is not limited to the specific arrangement and organization shown and described.

Figure 1 represents a perspective view of a vehicle wagon embodying my invention. Fig. 2 represents a side elevation thereof, showing the certain members in different positions from those in Fig. 1. Fig. 3 represents a horizontal section of a portion on an enlarged scale. Fig. 4 represents a vertical section of a portion on an enlarged scale. Fig. 5 represents a vertical section of another portion on an enlarged scale.

Similar letters of reference indicate corresponding parts in the figures.

Referring to the drawings:—A designates the bed of the vehicle of the order of a cart or wagon, the same being mounted in front on the pilot or caster wheel B, and in the rear on the wheels C.

The running gear of the cart consists of the reaches D, the reaches E and the hangers F, which parts are preferably formed of metallic tubes, as is also the marginal frame G of the bed A.

The hangers F are connected with the side members of the frame G at the rear portion of the latter, and are mounted on the axle of the rear wheels C, as are also the rear ends of the reaches E. The front ends of said side members are inturned, forming the gudgeons H, which occupy the rotatable sleeve J, it being noticed that the front ends of the reaches D are firmly connected as at K with the inturned portions of the frame G outside of said sleeve J, in any suitable manner.

On the gudgeons H are grooves forming the necks L, which freely receive the pins or screws M, whereby the sleeve J and said gudgeons are connected and the gudgeons prevented from spreading, while said sleeve is permitted to turn on said gudgeons, the screws M being fitted in said sleeve, so as to enter said necks, as is evident. Passing freely through said sleeve is the standard or post N, whose lower end is connected by the knuckle P, with the stub Q, which latter occupies the eye R on the forward end of the reaches E, it being noticed that the pilot or caster roller B is mounted on the lower end of said stub Q, it being noticed also that said reaches E converge from the axle of the rear wheels C to said eye R, with which they are firmly connected, it being noticed further also that the bed A, reaches D and hangers F may turn on the axle of the rear wheel, whereby said bed may be placed in horizontal position, as shown in Fig. 1, or inclined, as shown in Fig. 2.

Firmly secured to the front end portions of the side members of the frame G and projecting forwardly therefrom, is the strap S, below which is the shank of the screw T, whose point enters a threaded opening in the sleeve J and is adapted to tighten against the standard N.

It will now be seen that when the bed is in horizontal position, the parts are disposed, as shown in Fig. 1. In this case, the screw engages the standard N, and so prevents the sleeve J from sliding on said standard and so shifting either up or down.

When it is desired to place the bed in inclined position, as shown in Fig. 2, the screw T is turned to release the standard N, when the bed may be raised on the axle of the hind wheels C. As the bed moves, the sleeve J turns on the gudgeons H as its axis, and the standard N owing to the knuckle-joint P, turns on the latter, and so conforms to the circular motion of the sleeve J, whereby there is no binding of said sleeve on the bed, or of said standard in said sleeve. When the desired angle of the bed is attained, the screw T is tightened, whereby the sleeve J is controlled and the bed is held immovable, it being evident that when the screw T is loosened the bed may be lowered, the sleeve rotating and sliding on the standard, and the latter conforms to the turning motion of the sleeve, as in the previous explanation, in all cases there being an ease of operation of parts, a simplification, and inexpensiveness of construction, and a device of great strength.

Attention is directed to the fact that the vehicle will be found light in nature, whereby it is admirably adapted to permit deformed children to receive attention constantly during the day without the necessity of continually remaining in bed.

By using the wheels C, a child can readily propel the vehicle around the hospital or ward, while portions of his body may be subjected to a drawing tension of fracture attachments and weights applied to the straps S, S', respectively at the front and rear of the frame G, the mind of the child thus being diverted to some extent from its affliction, thus producing satisfactory results.

Having thus described my invention, what I claim as new and desire to secure by Letters Patent is:—

1. A vehicle of the character stated, a tilting bed, said bed having a frame with inturned ends, running gear for said bed with wheels thereon, a post rising from one end of said running gear and pivotally connected therewith, a rotatable member mounted on the adjacent inturned ends of said frame, the same being adapted to permit said post to pass freely therethrough, and means on said member adapted to engage said post to prevent lowering motion of said member and consequently of the bed.

2. In a vehicle of the character stated, a tilting frame, the same having inturned ends, a bed thereon, a rotatable member rotatably mounted on said inturned ends, a post adapted to pass freely through said member, a tightening device on said frame adapted to engage said member and post to prevent lowering motion of said frame, running gear on which said frame is mounted, and wheels for said gear, said post rising from said frame and being pivotally connected therewith, so as to conform to the rotary motions of said member.

3. In a vehicle, a bed, the frame of the same being mounted on running gear of the vehicle, said frame having inturned ends a post rising from a member of the said running gear and pivotally connected therewith, a piece rotatably encircling said ends, said bed being adapted to be placed in horizontal and inclined positions, said piece being adapted to have said post move therethrough and conform to the rotations of the same, means on said piece adapted to engage said post for preventing lowering of said bed and means on said rotatable piece adapted to swivel the same on said ends of the frame.

4. In a vehicle, a bed, the frame of the same being mounted on running gear of the vehicle and adapted to be placed in horizontal and inclined positions, a rotatable piece freely encircling the adjacent ends of the frame, means passing through said piece and freely entering said ends of the frame for swiveling said piece on said frame, said piece having a vertical opening therethrough, a post rising from and pivotally connected with running gear of the vehicle and being adapted to pass freely through said opening, and means for interlocking said piece and post whereby lowering of the bed is prevented.

5. In a vehicle, a bed adapted to be placed in horizontal and inclined positions, running gear adapted to support said bed, a post rising from a member of said running gear and pivotally connected therewith, a rotatable piece mounted on the end of the frame of the bed, said end having necks thereon, and pins on said piece adapted to engage said necks, said post being adapted to pass freely through said piece and conform to the rotatable motions thereof as the bed is raised and lowered.

6. In a vehicle, a bed, certain members of the running gear of the vehicle being axially mounted on wheels thereof and supporting said bed, an opposite wheel, the same being mounted on another member of the running gear, a post rising from the last named member and pivotally connected therewith, a rotatable sleeve mounted on the frame of the bed, means for swiveling said sleeve on said frame, said sleeve having a vertical opening therethrough, and means for interlocking said sleeve and post whereby lowering of the bed is prevented.

WILLIAM F. BERNSTEIN.

Witnesses:
  JOHN A. WIEDERSHEIM,
  HARRY C. DALTON.